United States Patent [19]
Horner

[11] Patent Number: 5,460,681
[45] Date of Patent: Oct. 24, 1995

[54] METHOD FOR RELEASING LINER FROM ADHESIVE SURFACE OF AN ARTICLE

[75] Inventor: J. Richard Horner, Fort Wayne, Ind.

[73] Assignee: Perstorp Components, Inc., Marshall, Mich.

[21] Appl. No.: 511,857

[22] Filed: Apr. 23, 1990

Related U.S. Application Data

[62] Division of Ser. No. 300,585, Jan. 23, 1989, abandoned.

[51] Int. Cl.⁶ ............................................. B32B 35/00
[52] U.S. Cl. .................. 156/344; 156/183; 156/249; 428/40; 428/43; 428/136; 428/138
[58] Field of Search ........................ 40/638; 156/344, 156/211, 249, 584, 183; 428/138, 40, 43, 136

[56] References Cited

U.S. PATENT DOCUMENTS

| | | | |
|---|---|---|---|
| 3,028,280 | 4/1962 | Hoffman | 156/344 X |
| 3,230,649 | 1/1966 | Karn | 40/2 |
| 3,859,157 | 1/1975 | Morgan | 156/268 |
| 3,983,645 | 10/1976 | Rycroft | 40/630 |
| 4,061,808 | 12/1977 | Sato | 65/28 |
| 4,173,510 | 11/1979 | Tobey | 156/344 X |
| 4,274,902 | 6/1981 | Jenkins | 156/253 X |
| 4,631,845 | 12/1986 | Smauel et al. | 40/638 |

FOREIGN PATENT DOCUMENTS 2158802  11/1985  United Kingdom ............... 40/638

*Primary Examiner*—Mark A. Osele
*Attorney, Agent, or Firm*—Arlyce R. Stearns

[57] ABSTRACT

A bend tab method which facilitates an efficient separation of a release liner from the pressure sensitive adhesive surface of an article.

5 Claims, 2 Drawing Sheets

METHOD FOR RELEASING LINER FROM ADHESIVE SURFACE OF AN ARTICLE

This application is a division of application Ser. No. 300,585, filed on Jan. 23, 1989 abandoned.

BACKGROUND OF THE INVENTION

The present invention relates generally to a device and method for removing lining material from the adhesive surface such as a pressure sensitive adhesive surface of an article. More specifically, the present invention is a device and method for obtaining a bend tab to facilitate the separation of the liner from the pressure sensitive adhesive surface of an article.

Those skilled in the art of separating lining material from the pressure sensitive adhesive surface of articles are aware of basic problems such as loss of tear-off tab members, nonrelease from the adhesive surface which results in damaged articles, tearing of the lining material which requires either considerable time consuming efforts to release the balance of the lining material, or rejection of the article. It is generally known to flex an article to release the lining material from the pressure sensitive adhesive surface, but such generalized flexing is inefficient and often ineffective for the complete separation of the lining material from the adhesive surface.

Other inefficient techniques used in the industry include a "kiss-cut," i.e., the article is cut but not the release liner. There are at least three modes for failure with such a technique: A. the article is not cut through one hundred percent (100%); B. the cut often penetrates both the article and a portion of the liner; and C. the liner is cut in a manner which destroys the tab. This technique often requires more expensive material to allow a larger margin for error. Such problems are costly in both labor and materials. Loss of tab members not only causes an additional disposal problem, the tabs can cause problems with subsequent machinery and operations.

Another attempt to solve the problem of efficiently separating the release liner from the pressure sensitive adhesive surface includes indenting a segment of the edge of the article and attaching another material to the release liner to bridge the gap caused by such indentation. There are at least two modes of failure inherent in this operation: A: the bridge tab applied is expensive and often pops off the release liner; and B. there is often a cohesive failure when the article consists of weaker materials, e.g. felts, roofing paper, and the like., and when the bridge tab is pulled to initiate the release of the liner, the forces required for such removal are concentrated in the areas of indentation adjacent the perimeter of the article, and this causes a failure because of the weak material, i.e., the material fails cohesively instead of initiating the release of the liner. Generally, when such "bridge" material fails to initiate the release of the liner material from the article, this destroys the article.

Currently available devices and methods for separating lining material from a pressure sensitive adhesive surface of an article includes a tear-off tab member which has a minimum land area and a narrow tab area which renders them too weak to be efficient and often causes cohesive failure of the article. Other methods of liner removal include an extension of a portion of the lining material beyond an edge of the article, and, in some applications, the adhesive material is not extended to the perimeter of the article. Other technology includes embrittling a portion of the release liner so that the liner breaks to form a released portion for grasping. Each of these methods requires the use of extra material as well as extra processing, and they are neither as efficient, effective nor as economical as is the device and method of the present invention.

The state of the art, thus far, does not provide an efficient, cost effective device and method for separating a lining material from the pressure sensitive adhesive surface of an article. The built-in waste factor from the presently available articles which have lining material applied to the pressure sensitive adhesive surface of the article, can adversely affect the economics of the application operation for such an article in industry. The time required for finding an alternate release segment when a tab member is lost, as well as the cost of rejecting articles rendered defective by the non-efficient separation of the lining material from the pressure sensitive adhesive surface, or cohesive failure of the article, adversely affect the economics of the currently available tab release methods.

SUMMARY OF THE INVENTION

The present invention overcomes the above-noted problems in the industrial use of separating lining material from pressure sensitive adhesive surfaces of articles. This invention provides a new and improved bend tab device and method for separating the lining material from the pressure sensitive adhesive surface of an article.

The unique feature of this invention is the novel use of the flexibility of both the article and the lining material, and the ability to increase such flexibility along a defined bend line within the perimeter of such article to form a bend tab. As the bend tab is bent along such line, a segment of the lining material at the perimeter of the article at opposite ends of the line separates from the pressure sensitive adhesive surface. By grasping such separated segment, the lining material can be efficiently separated from the pressure sensitive adhesive surface of the article. In some applications, with heavy, less flexible material, when the line is disposed in close proximity to the perimeter of the article, bending along such line will cause the lining material to slide over the edge of the article to be grasped for separating the lining material from the article.

It is an object of this invention to provide a bend tab for efficient separation of lining material from the pressure sensitive adhesive surface of an article.

It is another object of this invention to provide a bend tab for a more economical application of parts having at least one pressure sensitive adhesive surface.

It is a further object of this invention to provide a bend tab for the effective separation of lining material from the pressure sensitive adhesive surface of articles.

It is yet another object of this invention to provide a bend tab device and method for reducing the damage to articles during the separation of the lining material from the pressure sensitive adhesive surface of the articles.

It is yet another object of this invention to provide a bend tab device and method for separating lining material from the pressure sensitive adhesive surface of articles in a cost effective operation.

Additional objects and advantages of this invention will become apparent from the following detailed description.

BRIEF DESCRIPTION OF THE DRAWINGS

The above-mentioned and other features and objects of this invention, the manner of attaining them, and the invention itself will be better understood by reference to the following description of an embodiment taken in conjunction with the accompanying drawings. Like reference characters in the drawings refer to the same or similar parts throughout the views.

DESCRIPTION OF A PREFERRED EMBODIMENT

Figure 1:
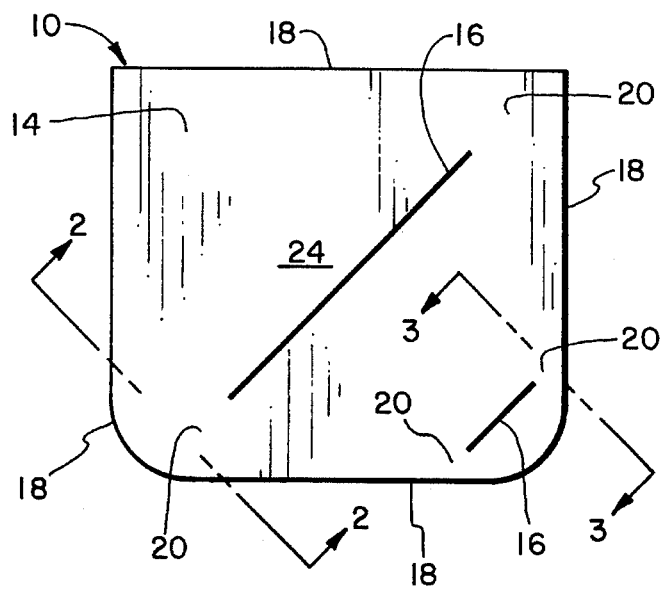
FIG. 1 A plan view of the described invention.
Figure 4:
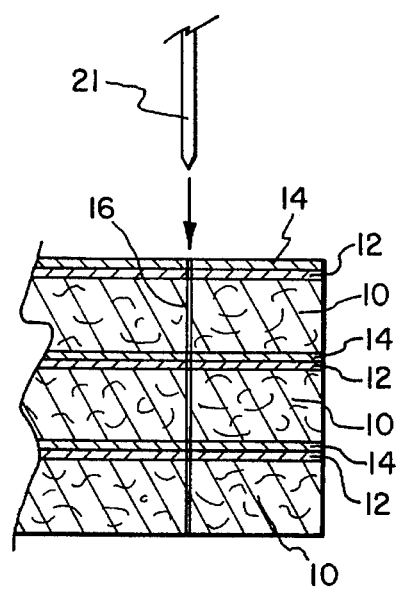
FIG. 4 An elevation view of the invention
Figure 2A:
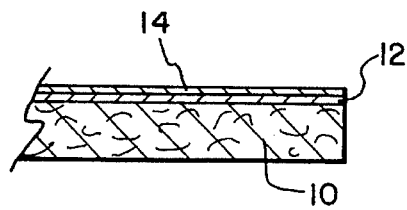
FIG. 2A An elevation view of the invention taken along the lines 2—2 in the direction of the arrows.
Figure 2B:
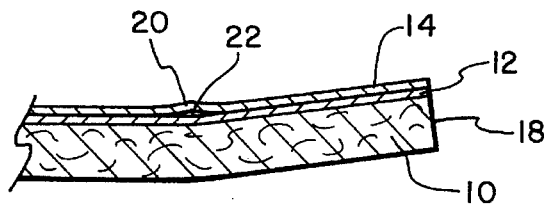
FIG. 2B Another elevation view of the invention shown in FIG. 2A.
Figure 2C:
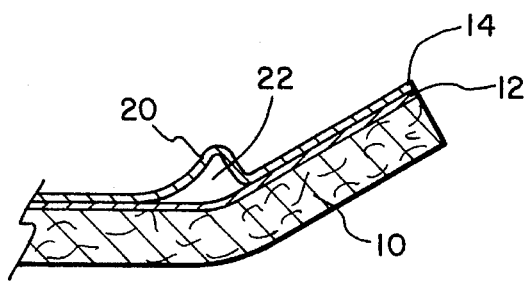
FIG. 2C Another elevation view of the invention shown in FIG. 2A.
Figure 2D:
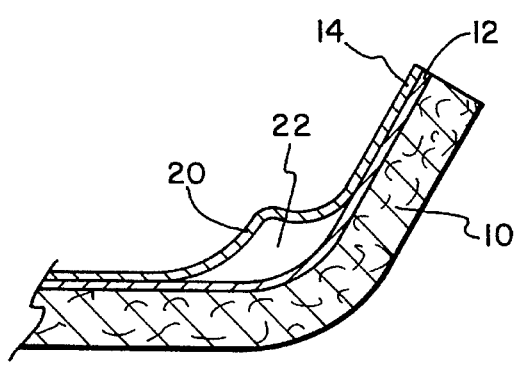
FIG. 2D Another elevation view of the invention shown in FIG. 2A.
Figure 3A:
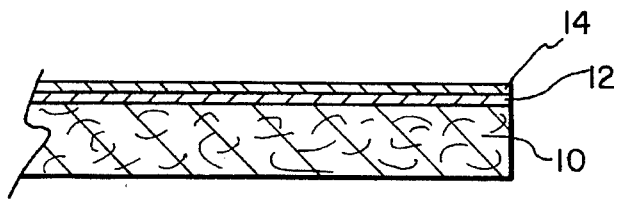
FIG. 3A An elevation view of the invention taken along the lines 3—3 in the direction of the arrows.
Figure 3B:
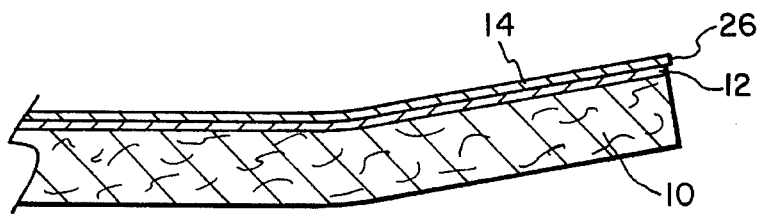
FIG. 3B Another elevation view of the invention shown in FIG. 3A.
Figure 3C:
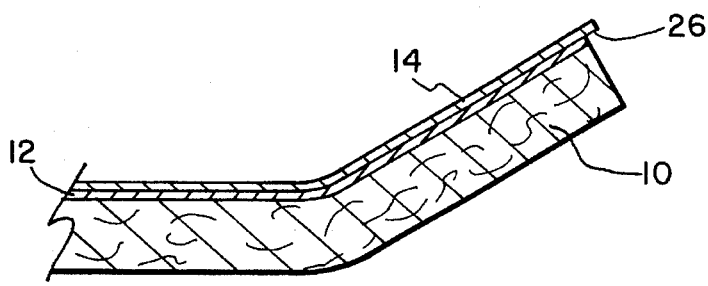
FIG. 3C Another elevation view of the invention shown in FIG. 3A.
Figure 3D:
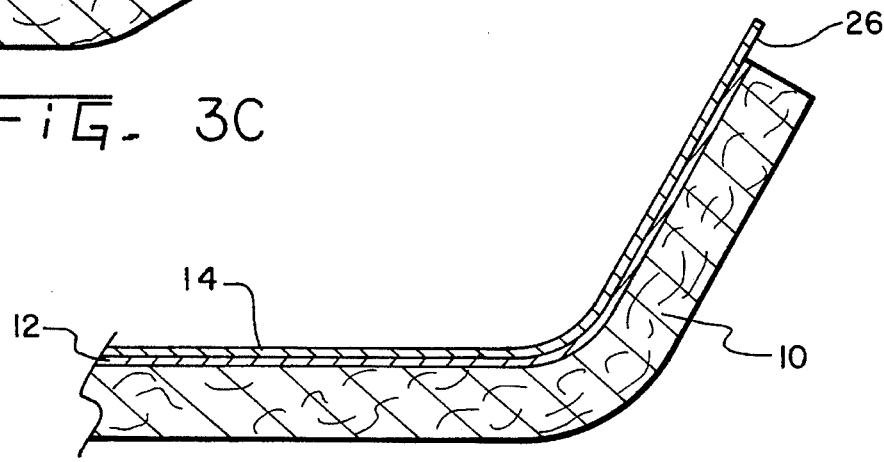
FIG. 3D Another elevation view of the invention shown in FIG. 3A.

Referring now to the drawings, and more particularly to FIGS. 1 and 4 there is shown an article generally designated as 10, with a pressure sensitive adhesive surface 12, release liner 14 and bend lines 16. Generally, only one bend line 16 is required on an article 10, and it can be disposed in any direction—horizontal, vertical, diagonal—on the article 10, but it should remain within the perimeter 18 of the article 10 to form a "land" portion 20 intermediate the opposite ends of the bend line 16 and the perimeter 18. A substantial land portion 20 is preferable for the clean, efficient separation without failure of the release liner 14. Such land portion 20, therefore, provides a structural integrity to the release liner 14 during total separation of the release liner 14 may be scored and/or perforated from article 10. For convenience if several articles are to be scored in one operation, both the article 10. The depth required for the land portion 20 will be a function of the adhesive material and the nature of the release liner 14.

The bend line 16 can be formed by scoring the article 10 with the release liner 14 or by using a tool 21 for perforating the article 10 with the release liner 14. Perforation has the advantage of preparing multiple articles in one operation as indicated in FIG. 4. When the purpose of the article 10 would be defeated by a perforation in the article 10, then scoring each article 10 would be preferable.

Referring now to FIGS. 2A through 2D, as the article 10 is bent along bend line 16, the land portion 20 at the perimeter 18, releases from the pressure sensitive adhesive surface 12 to form a grasp portion 22 for removing the entire release liner 14 from the article 10.

Referring now to FIGS. 3A through 3D, in an application using a thicker, less flexible release liner 14, by disposing the bend line 16 closer to the perimeter 18 than to the center portion 24 of the article 10, as the article 10 is bent along the bend line 16, the release liner 14 will slide over the perimeter 18 of article 10 to form a grasp portion 26 at the edge of article 10. The ratio of bend line 16 to the land portion 20 is a function of the amount land portion 20 required based on the pressure sensitive adhesive and the nature of the release liner 14. It is not required to score the release liner 14, therefore, except for expediting mass production of bend line 16 in articles 10.

Article 10 can be made of any flexible material such as metals, thermoset, thermoplastic, vinyl, paper, other fibrous material such as felt, cardboard, impregnated felts, roofing felt, and the like. Often articles such as Gaskets, headliners, and the like use pressure sensitive adhesive for their application.

In use, merely bending the article 10 on the bend line 16 will cause a portion of the release liner 14 to separate from the pressure sensitive adhesive surface 12, whereby the release liner 14 can be grasped by the appropriate grasp portion 22, or 26, to remove the release liner 14 from the article 10. Generally it appears to be more efficient to bend along bend line 16 whereby the release liner 14 folds back on itself, however, a grasp portion 22 or 26 will form when the article 10 folds back on itself, is then returned to a generally straight plane, and then flexed back about ten degrees toward release liner 14.

The novel method of this invention permits the separation of release liner 14 from a pressure sensitive adhesive surface 12 in an efficient and effective manner. This device and method reduces the costs of operation due to rejected parts as a result of articles damaged by the nonrelease of the release liner 14 or cohesive failure of the article 10.

The device and method of this invention contemplates use of automated equipment (not shown) which will index each article 10, clamp the article 10, form a bend line 16, flex article 10 along the bend line 16, clamp the grasp portion 20 or 26 of release liner 14, and remove the .liner material 14, then feed out the processed article 10 and index the next article 10. Such automation would lend itself to providing for immediate disposal of the liner material 14 as each article 10 was processed for application.

There have been described above the principles of this invention in connection with a specific device. It will be clearly understood, however, that this description is made only by way of example and not as a limitation as to the scope of the invention.

What is claimed is:

1. A method of separating lining material from a pressure sensitive adhesive surface of an article, said method comprising the steps of:

creating a bend line on the article within an area defined by the perimeter of said article with said lining material covering said pressure sensitive adhesive surface;

bending said article with said lining material attached whereby a portion of said lining material is caused to wrinkle intermediate at least one end of said bend line and an adjacent segment of said perimeter, and releases from said pressure sensitive adhesive surface; and grasping said released portion of said lining material; and then removing said lining material from the adhesive surface of said article.

2. The method of claim 1, wherein the step of creating a bend line comprises scoring a substantially straight line within said area intermediate a center portion of said article and said perimeter, whereby a land portion of said article lies intermediate each of opposite ends of said line and a respective segment of said perimeter.

3. The method of claim 1, wherein the step of creating a bend line comprises perforating a substantially straight line through said article within said area intermediate a center portion of said article and said perimeter, whereby a land portion of said article with said attached liner material lies intermediate each of opposite ends of said line and a respective segment of said perimeter.

4. The method of claim 1, wherein the step of bending includes bending along said bend line whereby said lining material is disposed within said bend.

5. The method of claim 1, wherein the step of bending includes bending along said bend line whereby said article is disposed within said bend.

* * * * *

UNITED STATES PATENT AND TRADEMARK OFFICE
CERTIFICATE OF CORRECTION

PATENT NO. : 5,460,681
DATED : October 24, 1995
INVENTOR(S) : J. Richard Horner

It is certified that error appears in the above-indentified patent and that said Letters Patent is hereby corrected as shown below:

COLUMN 3:

Line 43, after "14", second occurrence, delete "may be";

Line 44, delete "scored and/or perforated", and after "10.", delete "For convenience if";

Line 45, delete "several articles are to be scored in one operation, both the"; and Line 46, delete "article 10.".

COLUMN 4:

Line 13, change "Gasket" to --gasket--.

Signed and Sealed this

Twenty-third Day of April, 1996

Attest:

BRUCE LEHMAN

Attesting Officer

Commissioner of Patents and Trademarks